US010262259B2

(12) United States Patent
Lin et al.

(10) Patent No.: US 10,262,259 B2
(45) Date of Patent: Apr. 16, 2019

(54) BIT WIDTH SELECTION FOR FIXED POINT NEURAL NETWORKS

(71) Applicant: QUALCOMM Incorporated, San Diego, CA (US)

(72) Inventors: Dexu Lin, San Diego, CA (US); Venkata Sreekanta Reddy Annapureddy, San Diego, CA (US); David Jonathan Julian, San Diego, CA (US); Casimir Matthew Wierzynski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 14/936,594

(22) Filed: Nov. 9, 2015

(65) Prior Publication Data

US 2016/0328647 A1 Nov. 10, 2016

Related U.S. Application Data

(60) Provisional application No. 62/159,097, filed on May 8, 2015.

(51) Int. Cl.
*G06N 3/08* (2006.01)
*G06N 3/10* (2006.01)
*G06F 17/11* (2006.01)
*G06N 3/063* (2006.01)

(52) U.S. Cl.
CPC .............. *G06N 3/08* (2013.01); *G06F 17/11* (2013.01); *G06N 3/063* (2013.01); *G06N 3/10* (2013.01)

(58) Field of Classification Search
USPC ........................................... 706/22
See application file for complete search history.

(56) References Cited

U.S. PATENT DOCUMENTS

| 8,423,852 | B2 * | 4/2013 | Garudadri | G10L 19/005 714/747 |
|---|---|---|---|---|
| 8,468,109 | B2 | 6/2013 | Moussa et al. | |
| 8,831,141 | B2 * | 9/2014 | Budianu | G01S 11/00 375/316 |
| 8,879,643 | B2 * | 11/2014 | Garudadri | G10L 19/005 370/514 |
| 9,886,418 | B2 * | 2/2018 | Yang | G06F 17/16 |
| 2009/0259906 | A1 * | 10/2009 | Garudadri | G10L 19/005 714/747 |

(Continued)

OTHER PUBLICATIONS

Deep Convolutional Neural Network Inference with Floating-pointWeights and Fixed-point Activations, Liangzhen Lai, Naveen Suda, Vikas Chandra, ARM Research, International Conference on Machine Learning (ICML) 2017.*

(Continued)

*Primary Examiner* — Michael B Holmes
(74) *Attorney, Agent, or Firm* — Seyfarth Shaw LLP

(57) ABSTRACT

A method for selecting bit widths for a fixed point machine learning model includes evaluating a sensitivity of model accuracy to bit widths at each computational stage of the model. The method also includes selecting a bit width for parameters, and/or intermediate calculations in the computational stages of the mode. The bit width for the parameters and the bit width for the intermediate calculations may be different. The selected bit width may be determined based on the sensitivity evaluation.

30 Claims, 6 Drawing Sheets

(56) References Cited

U.S. PATENT DOCUMENTS

| | | | | |
|---|---|---|---|---|
| 2009/0259922 | A1* | 10/2009 | Garudadri | G10L 19/005 714/799 |
| 2011/0316747 | A1* | 12/2011 | Budianu | G01S 11/00 342/387 |
| 2014/0046885 | A1 | 2/2014 | Majumdar et al. | |
| 2014/0222738 | A1 | 8/2014 | Joyce et al. | |
| 2014/0280430 | A1 | 9/2014 | Kim | |
| 2015/0142807 | A1 | 5/2015 | Hofmann et al. | |
| 2015/0170021 | A1 | 6/2015 | Lupon et al. | |
| 2015/0269479 | A1* | 9/2015 | Julian | G06N 3/0481 706/25 |
| 2015/0269480 | A1* | 9/2015 | Levin | G06N 3/08 706/25 |
| 2015/0269481 | A1* | 9/2015 | Annapureddy | G06N 3/0445 706/21 |
| 2015/0269482 | A1* | 9/2015 | Annapureddy | G06N 3/049 706/25 |
| 2016/0019455 | A1* | 1/2016 | Annapureddy | G06N 3/08 706/17 |
| 2016/0019456 | A1* | 1/2016 | Annapureddy | G06N 3/08 706/22 |
| 2016/0328644 | A1* | 11/2016 | Lin | G06N 3/08 |
| 2016/0328645 | A1* | 11/2016 | Lin | G06N 3/08 |
| 2016/0328646 | A1* | 11/2016 | Lin | G06N 3/08 |
| 2017/0060811 | A1* | 3/2017 | Yang | G06F 17/16 |
| 2018/0060278 | A1* | 3/2018 | Lin | G06F 17/17 |

OTHER PUBLICATIONS

Fixed Point Quantization of Deep Convolutional Networks, Darryl D. Lin, Qualcomm Research, Sachin S. Talathi, Qualcomm Research,V. Sreekanth Annapureddy, NetraDyne Inc., Proceedings of the 33 rd International Conference on Machine, Learning, New York, NY, USA, 2016. JMLR: W&CP vol. 48.*

EURASIP Journal on Embedded Systems Dec. 2009, 2009:258921 | Performance Analysis of Bit-Width Reduced Floating-Point Arithmetic Units in FPGAs: A Case Study of Neural Network-Based Face Detector, Yongsoon Lee, Younhee Choi, Seok-Bum Ko, Moon Ho Lee.*

Deep Learning with Limited Numerical Precision, Suyog Gupta, Ankur Agrawal, Kailash Gopalakrishnan, Pritish Narayanan, IBM T. J. Watson Research Center, Proceedings of the 32 nd International Conference on Machine Learning, Lille, France, 2015. JMLR: W&CP vol. 37.*

EIE: Efficient Inference Engine on Compressed Deep Neural Network Published in: 2016 ACM/IEEE 43rd Annual International Symposium on Computer Architecture (ISCA) Aug. 25, 2016, Song Han, Xingyu Liu, Huizi Mao, Jing Pu, Ardavan Pedram, Mark A. Horowitz, William J. Dally pp. 243-254.*

Fixed Point Quantization of Deep Convolutional Networks Darryl D. Lin, Sachin S. Talathi, V. Sreekanth Annapureddy Proceedings of the 33 rd International Conference on Machine Learning, New York, NY, USA, 2016 pp. 1-10.*

Anwar S., et al., "Fixed Point Optimization of Deep Convolutional Neural Networks for Object Recognition," 2015 IEEE International Conference on Acoustics, Speech and Signal Processing (ICASSP), Apr. 1, 2015 (Apr. 1, 2015), pp. 1131-1135, XP055284772, DOI: 10.1109/ICASSP.2015.7178146 ISBN: 978-1-4673-6997-8.

Audhkhasi K., et al., "Noise Benefits in Convolutional Neural Networks," Proceedings of the 2014 World Congress in Computer Science, Computer Engineering, and Applied Computing, Jul. 21, 2014 (Jul. 21, 2014), pp. 1-8, XP055286068, Retrieved from the Internet: URL:http://worldcomp-proceedings.com/proc/p2014/ABD3492.pdf [retrieved on Jul. 5, 2016].

Caffarena G., et al., "SQNR Estimation of Fixed-Point DSP Algorithms," EURASIP Journal on Advances in Signal Processing,Jan. 1, 2010 (Jan. 1, 2010),vol. 2010, No. 1, pp. 1-12, XP055286043, DE ISSN: 1687-6180, DOI: 10.1109/TCSI.2004.823652.

Hwang K., et al., "Fixed-Point Feedforward Deep Neural Network Design Using Weights +1, 0, and −1," IEEE Workshop on Signal Processing Systems (SiPS), 2014, 6 pages.

International Search Report and Written Opinion—PCT/US2016/026944—ISA/EPO—dated Jul. 18, 2016.

Lin D.D., et al., "Fixed Point Quantization of Deep Convolutional Networks," Nov. 19, 2015 (Nov. 19, 2015), pp. 1-10, XP055284812, Retrieved from the Internet: URL:https://arxiv.org/pdf/1511.06393v3.pdf [retrieved on Jun. 30, 2016].

Menard D., et al., "Floating-to-Fixed-Point Conversion for Digital Signal Processors," EURASIP Journal of Applied Signal Processing,Jan. 1, 2006 (Jan. 1, 2006),vol. 2006, pp. 1-19, XP055286071, US ISSN: 1110-8657, DOI: 10.1155/ASP/2006/96421.

Modi, S., "Dynamic Word-length Variation in Artificial Neural Network Digital Hardware," An investigation into adaptive power reduction techniques for neural hardware, Jun. 8, 2012 (Jun. 8, 2012), pp. 66-83, XP055100160, Retrieved from the Internet:URL:http://eprints.soton.ac.uk/id/eprint/209079 [retrieved on Feb. 3, 2014], Sections 5.1 and 5.2.

Sung W., et al., "Simulation-based Word-length Optimization Method for Fixed-point Digital Signal Processing Systems," IEEE Transactions on Signal Processing, IEEE Service Center, New York, NY, US,Dec. 1, 1995 (Dec. 1, 1995),vol. 43, No. 12, pp. 3087-3090, XP002369850, ISSN: 1053-587X, DOI: 10.1109/78.476465.

* cited by examiner

BIT WIDTH SELECTION FOR FIXED POINT NEURAL NETWORKS

CROSS-REFERENCE TO RELATED APPLICATION

The present application claims the benefit of U.S. Provisional Patent Application No. 62/159,097, filed on May 8, 2015, and titled "BIT WIDTH SELECTION FOR FIXED POINT NEURAL NETWORKS," the disclosure of which is expressly incorporated by reference herein in its entirety.

BACKGROUND

Field

Certain aspects of the present disclosure generally relate to machine learning and, more particularly, to improving systems and methods of bit width selection for fixed point machine learning models, such as an artificial neural network.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may involve fine-tuning using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In an aspect of the present disclosure, a method for selecting bit widths for a fixed point machine learning model is presented. The method includes evaluating a sensitivity of model accuracy to bit widths at each computational stage of the machine learning model. The method also includes selecting a bit width for parameters, and/or intermediate calculations in the computational stages of the model based on the sensitivity evaluation. The bit width for the parameters and the bit width for the intermediate calculations may be different.

In another aspect of the present disclosure, an apparatus for selecting bit widths for a fixed point machine learning model is presented. The apparatus includes a memory and at least one processor coupled to the memory. The one or more processors are configured to evaluate a sensitivity of model accuracy to bit widths at each computational stage of the machine learning model. The processor(s) are also configured to select a bit width for parameters and/or intermediate calculations in the computational stages of the model based on the sensitivity evaluation. The bit width for the parameters and the bit width for the intermediate calculations may be different.

In yet another aspect of the present disclosure, an apparatus for selecting bit widths for a fixed point machine learning model is presented. The apparatus includes means for evaluating a sensitivity of model accuracy to bit widths at each computational stage of the machine learning model. The apparatus further includes means for selecting a bit width for parameters, and/or intermediate calculations in the computational stages of the model based on the sensitivity evaluation. The bit width for the parameters and the bit width for the intermediate calculations may be different.

In another aspect of the present disclosure, a non-transitory computer readable medium is presented. The non-transitory computer readable medium has encoded thereon program code for selecting bit widths for a fixed point machine learning model. The program code is executed by a processor and includes program code to evaluate a sensitivity of model accuracy to bit widths at each computational stage of the machine learning model. The program code also includes program code to select a bit width for parameters, and/or intermediate calculations in the computational stages of the model based on the sensitivity evaluation. The bit width for the parameters and the bit width for the intermediate calculations may be different.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
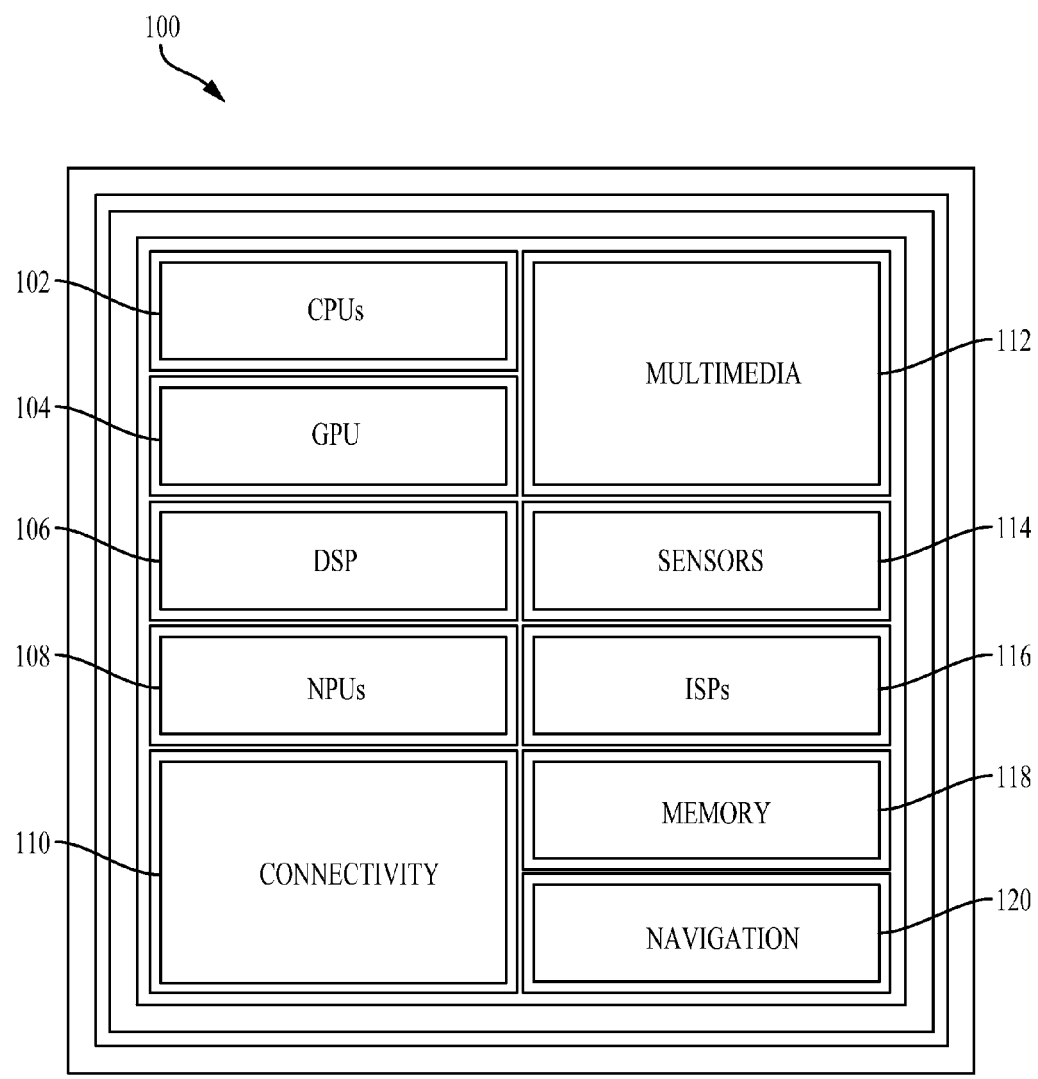
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Bit Width Selection for Fixed Point Neural Networks

Machine learning models may be configured using a fixed point implementation or a floating point implementation. In a floating point implementation, elements and parameters of the model, as well as input data, may be represented using floating point numbers. On the other hand, in a fixed point representation, a fixed position of the decimal point is chosen such that there are a fixed number of bits to the right and/or the left of the decimal point and used to represent the elements, parameters and inputs of the model. Floating point representations may offer greater precision. On the other hand, a fixed point implementation may be desirable for machine learning model such as an artificial neural network (ANN). Specifically, a fixed point implementation may reduce a model size, reduce processing time, reduce memory bandwidth, and/or reduce power consumption.

One challenge of fixed point implementation is to determine the bit widths to represent different components in a model (e.g., neural network). In some cases, a particular bit width may be used throughout the network. Still, the use of different bit widths in different components of the network may be more desirable. For example, different bit widths may be selected for bias values, activation values, and/or weights of each layer of the neural network. Aspects of the present disclosure are directed to selecting a bit width for different layers and/or different components of each layer of an ANN. Additionally, aspects of the present disclosure are directed to changing the bit widths based on performance specifications and system resources.

In some aspects, model performance may be evaluated using a signal to quantization noise ratio (SQNR). That is, in a machine learning model such as a deep convolutional network, the effect of quantizing weights and/or activations is the introduction of quantization noise. Similar to other communication systems, when quantization noise increases, the model performance decreases. Accordingly, the SQNR observed at the output may provide an indication of model performance or accuracy.

In some aspects, the model quantizer may have a fixed efficiency of K dB/bit. In other words, every bit in a fixed point representation contributes K dB SQNR. As such, the SQNR may be employed to select an improved or optimized bit width. The bit width may be selected for the entire model or may be selected on a computational stage (e.g., a layer of a deep convolutional network (DCN)) by computational stage basis. For example, given an SQNR target at the output of a DCN of Y dB having N layers in which noise is introduced due to quantization, overall bit width in a model may be selected by minimizing the following:

$$\frac{1}{K} \times \sum_i 10 \log \frac{1}{x_i}, \tag{1}$$

where K represents the quantizer efficiency and $x_i$ represents the quantization noise variance (or power) introduced at each computational stage (e.g., layer) of the model. In some aspects, the signal variance (or power) of each stage may be assumed to be normalized to 1 for simplicity of notation. The bit width selection may be subject to certain constraints. For example, in some aspects, the bit width selection may be subject to a threshold of SQNR at the output of the model, which may be expressed as:

$$\frac{1}{\Sigma_i x_i} = SQNR_{min(linear)} \tag{2}$$

As such, Equations 1 and 2 may be considered an SQNR budget for a machine learning model.

Equation 2 may represent the allowable quantization noise for injection. Because the model may be linear in the region of interest, noise may be additive from one computational stage to the next. As such, the objective function of Equation 1 is the total number of bits or bit width at each computational stage or layers.

In some aspects, the bit width selection may be simplified as:

$$\min -\Sigma \rho_i \log(x_i), \text{s.t. } \Sigma \alpha_i x_i = C, \qquad (3)$$

where $\alpha_i$ is the noise amplification or reduction factor from layer i to the output, C is a constant that constrains the $\alpha$ factors, and $\rho_i$ is a scaling factor of the bit width at layer i. In one exemplary aspect, $\rho_i$ represents the number of parameters if the objective is to reduce model size. In another example, $\rho_i$ represents the number of multiply-accumulates (MACs) for each layer, if the objective is to reduce computations. In some aspects, the constant C may be computed based on the SQNR limit.

The noise that may be introduced for each layer may be proportional to the bit width scaling factor and inversely proportional to the amplification factor. If a particular layer has a high scaling factor (e.g., because there are many neurons), the quantizer may increase the bit width reduction, if the objective is to reduce overall model size. Accordingly, the bit width selection may be similar to a water filling equation and given by:

$$\frac{\rho_1}{\alpha_1 x_1} = \frac{\rho_2}{\alpha_2 x_2} = \ldots = \frac{\rho_i}{\alpha_i x_i} \qquad (4)$$

This bit width selection formulation also recognizes and accounts for differences in the layers of the neural network. That is, bit width selection may be more impactful in some layers than in others. For example, fully connected layers of an ANN may be more robust to quantization noise compared to convolutional layers. That is, the fan-ins at fully connected layers may be greater, thus leading to suppression of quantization noise. Additionally, if it is desired to reduce a model size, it may be desirable for the fully connected layers to have a greater quantization in comparison to the quantization of the convolutional layers. Notably, the number of parameters in fully connected layers may be greater than the parameters of the convolutional layers. Thus, quantizing fully connected layers may lead to greater model size reduction when compared with quantizing convolutional layers.

In another example, comparing a layer that has one million weights to a layer that has one thousand weights, for the one million weight layer, a small reduction in bit width can produce a significant change in the overall model size. On the other hand, in the layer with one thousand weights, a larger bit width may have a smaller impact.

In one example, for simplicity and ease of understanding, the scaling factors and noise amplification factors may be assumed to be the same across layers. In this example, $x_i$'s may be equal, and the SQNR budget for each layer may be the same. Furthermore, if N layers are assumed, the SQNR specification at each layer may be $SQNR_{min} + 10 \log N$. Specifically, in one example, where $SQNR_{min} = 26$ dB and N=10, the per layer SQNR specification is 36 dB (or 12 bits, if assuming 3 dB/bit).

In some aspects, additional safety factors may be added to account for non-Gaussian distribution of activations and weights and/or variations for different training and test sets. For example, suppose that quantization efficiency is K=3 dB/bit. With a bit width of 12, the SQNR specification may be 36 dB SQNR per layer. However, in reality the quantization efficiency may be 2.5 dB/bit because the input distribution at test time may be different, for instance. As such the actual SQNR per layer may be 30 dB SQNR per layer. The resulting SQNR at the output would be 20 dB, which is lower than $SQNR_{min}$. One way to prevent this from happening is to add a safety factor to the SQNR specification at each layer (e.g., +12 dB). That is, instead of an SQNR per layer of 36 dB, a target of 48 SQNR per layer may be used. That amounts to a bit width of 16. As such, even if the actual quantization efficiency is 2.5 dB/bit, 40 dB SQNR per layer may be achieved, and results in SQNR at the output of 30 dB, which is higher than $SQNR_{min}$.

The bit width selection techniques described above may also be applied to components of a computational stage (e.g., layer). For example, in some cases, a layer of an ANN such as DCN may refer to biases, weights, and/or activation values. Still, quantization operations that introduce quantization noise may be considered as affecting a layer for the purpose of selecting bit widths. That is, each bias, weight, and activation value may be considered a layer. In other words, the process of quantizing weights and biases can be considered a "layer", and quantizing activations can be considered another "layer" in the above SQNR computation.

For instance, a DCN with 3 convolutional layers, for the purpose of the SQNR calculation, may have 6 quantization "layers", or steps as follows:

Quantize weights and biases of convolution layer (conv) 1,
Quantize activations of conv1,
Quantize weights and biases of conv2,
Quantize activations of conv2,
Quantize weights and biases of conv3,
Quantize activations of conv3.

Each quantization layer or step may introduce a certain amount of quantization noise.

In one example, weight w is multiplied by activation a. Both the weight and activation may include inherent quantization noise $n_w$ and $n_a$. Because $(w+n_w) \times (a+n_a) \approx w \cdot a + w \cdot n_a + n_w \cdot a$, and a new SQNR due to the noise terms may satisfy:

$$\frac{1}{SQNR_{w \times a}} = \frac{1}{SQNR_w} + \frac{1}{SQNR_a} \qquad (5)$$

As such, it follows that introducing quantization noise to weights and activation values independently may be similar to adding the total noise after the product operation in a normalized system.

In some cases, a bit width for activation values may be smaller than a bit width for weights (or vice versa). Furthermore, bit width selection may be based on a number of weights per layer, a number of activation values per layer, filter size per layer, filter stride per layer, and/or a number of filters per layer in the model.

Transfer Learning

In some aspects, transfer learning may be adopted to perform a learning task. In this case, a machine learning model (e.g., DCN) may be used to extract features from an input (e.g., an image) and to generate a corresponding feature vector. For a classification task, the features may be used to train a classifier (e.g., a support vector machine (SVM)). Because the classifier may be retrained following the quantization, the model may be further enhanced and may be less sensitive to quantization noise.

Random Weights

In some aspects, the model may be initialized with random weights. For example, random weights may be used for fully connected layers. Because the classifier (e.g., SVM) may be retrained, as indicated above, the model may be stored without storing the weights. Thus, bit width may be further reduced for the fully connected layers. Therefore, the model size may be greatly reduced.

In some aspects, the bit width of intermediate calculations (e.g., activation) may be reduced online. For example, the activation bit width may be selected online as a function of model performance, device capability, latency requirements and the like. In some aspects, the bit width of intermediate calculations for different computational stage (e.g., layers) may also be determined based on a priority, for example, determined by the cost function of Equation 1 or another cost function. For instance, the cost function could be based on user feedback collected during or after applying the model. The user feedback may indicate that the model has made a classification error or has taken too long to compute a label, for example.

In some aspects, the SQNR budget may be determined based on an empirical approach. For a given data set, noise may be injected layer by layer. Injecting noise may, for example, comprise injecting random noise or performing quantization according to a specific bit width.

The model performance (e.g., classification accuracy and/or speed) may thereafter be evaluated to determine whether the performance remains acceptable relative to a threshold. Because of the structure of data (as opposed to structure of the model or network), certain layers may have very sparse activations, and therefore may have larger noise budgets (less sensitive to noise).

Additionally, in some aspects, the bit width may be dynamically adjusted based on user feedback. For example, a user may provide an indication of classifier performance (e.g., point out classification errors). The number of instances of the user indications may be compared to a threshold and used to adjust the bit width (e.g., triggering a reload of the model at a finer quantization).

FIG. 1 illustrates an example implementation of the aforementioned selection of bit widths for a fixed point machine learning model, using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for evaluating a sensitivity of model accuracy to bit widths at each computational stage of the model. The instructions loaded into the general-purpose processor 102 may also comprise code for selecting a bit width for one or more of parameters and intermediate calculations in each computational stage of the model based on the evaluation of the model accuracy sensitivity.

Figure 2:
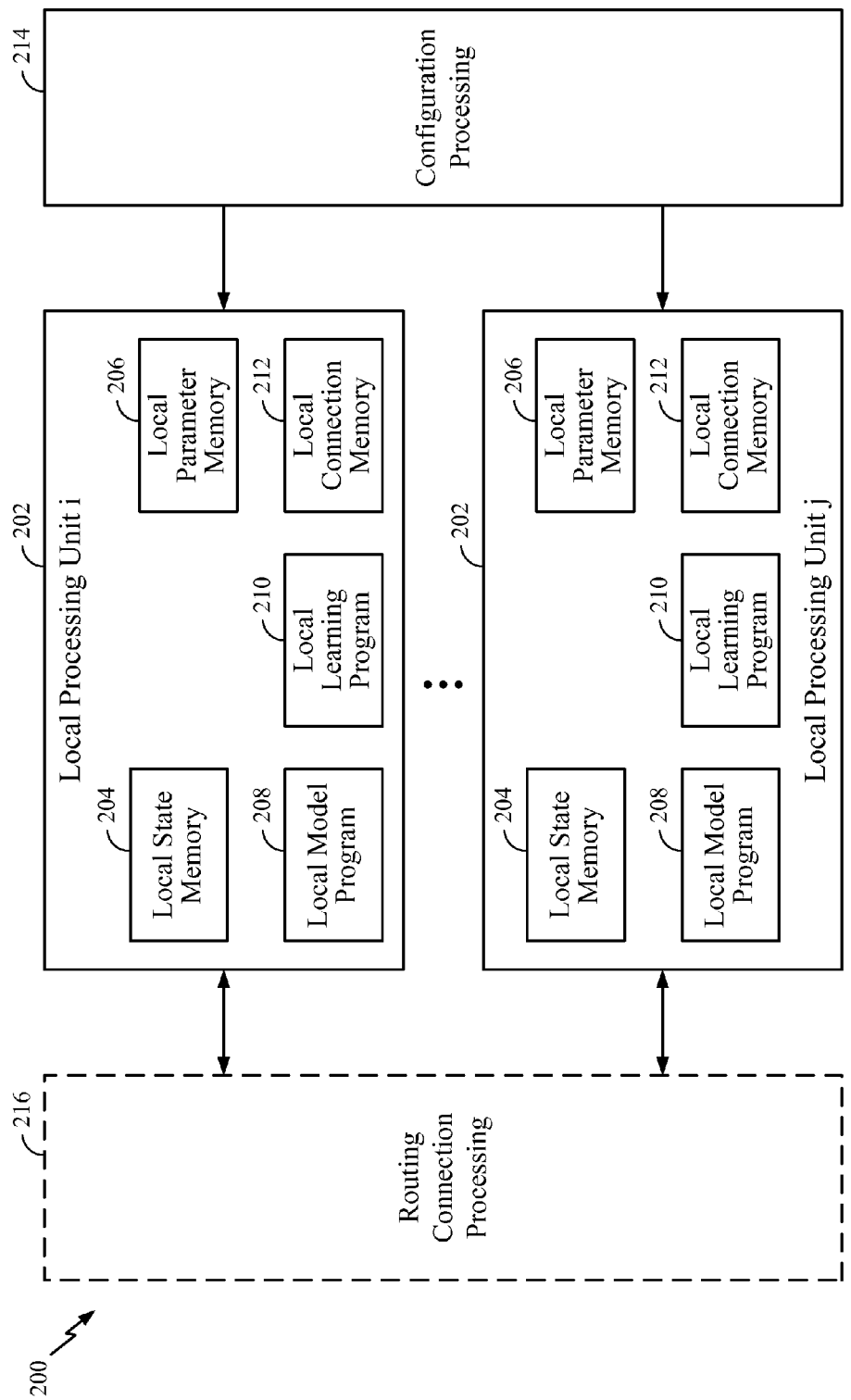
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high level concept may aid in discriminating the particular low-level features of an input.

Figure 3A:
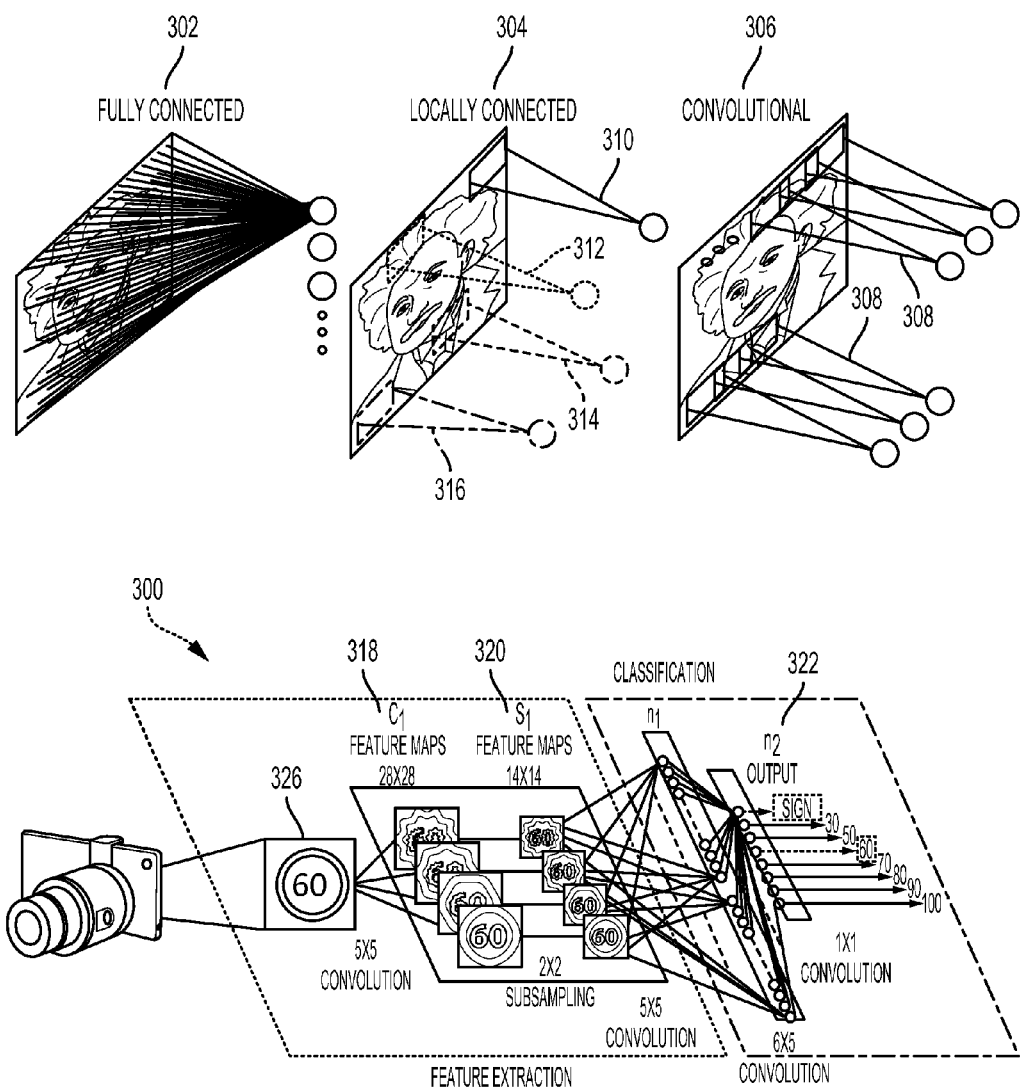
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
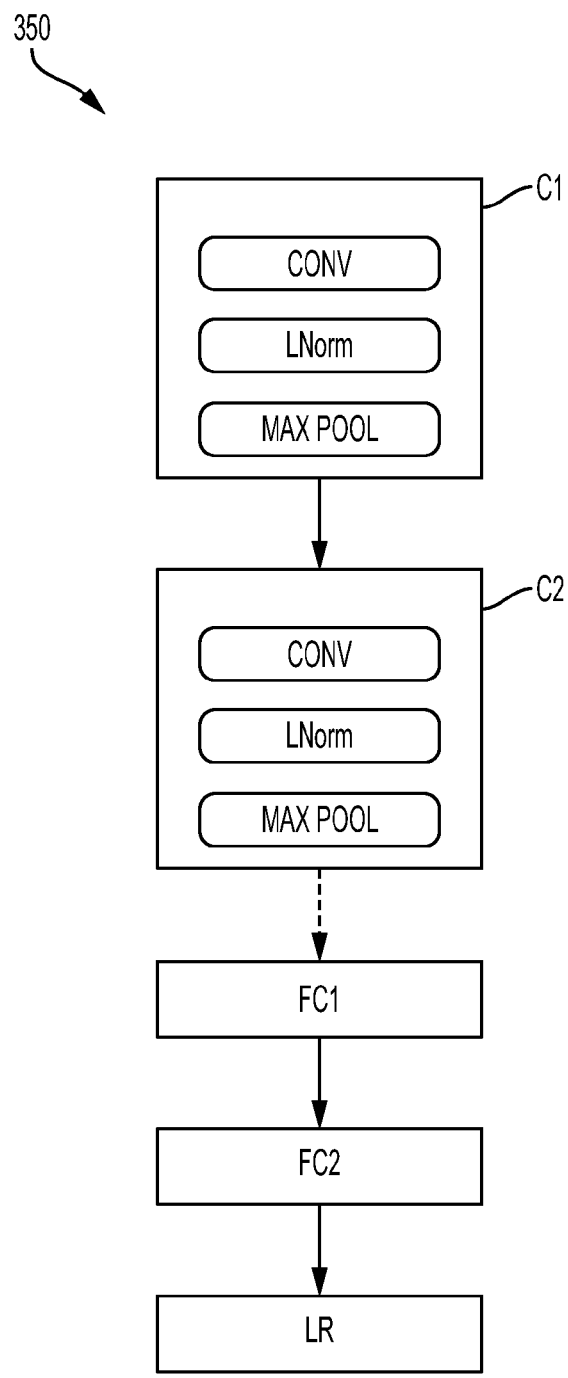
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

In one configuration, a machine learning model is configured for evaluating a sensitivity of model accuracy to bit widths at each computational stage of the model and selecting a bit width for one or more of parameters and intermediate calculations in each computational stage of the model based on the evaluating. The model includes evaluating means and/or selecting means. In one aspect, the evaluating means and/or selecting means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Figure 4:
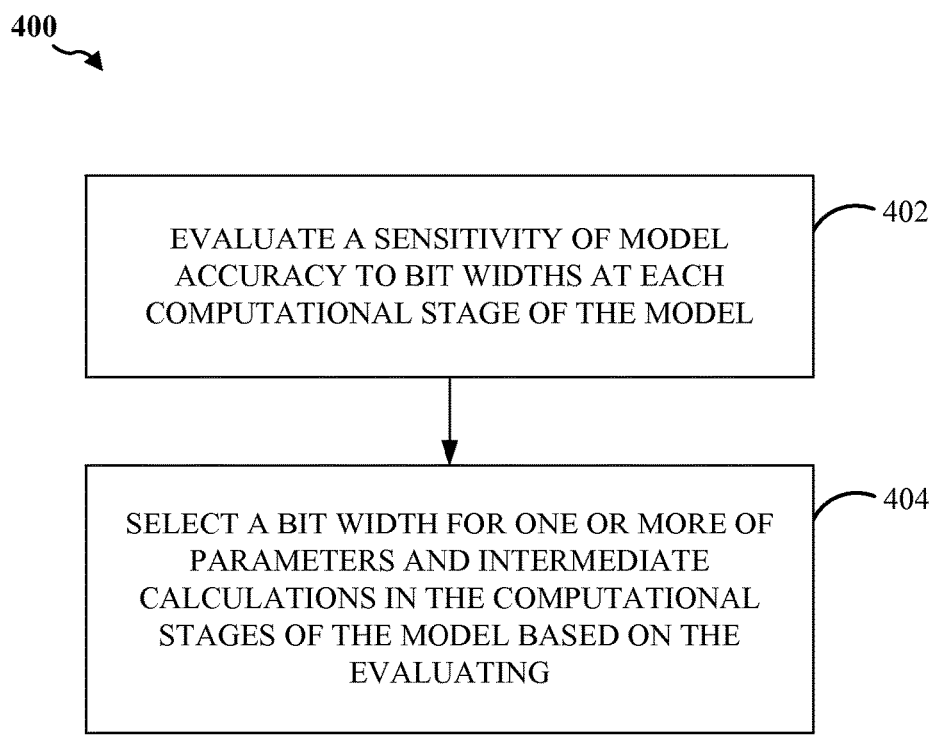
FIGS. 4 and 5 illustrate methods for selecting bit widths for a fixed point machine learning model in accordance with aspects of the present disclosure.

FIG. 4 illustrates a method 400 for selecting bit widths for a fixed point machine learning model. In block 402, the process evaluates a sensitivity of model accuracy to bit widths at each computational stage of the model. The model accuracy may comprise a measure of signal quantization to noise ratio (SQNR) at an output of the model or classification accuracy. In some aspects, the output may use a floating point number format.

In block 404, the process selects a bit width for parameters and intermediate calculations in each computational stage of the model based on the evaluating. In some aspects, the bit width for intermediate calculations of a computational stage may be less than the bit width for parameters in the computational stage, or vice versa.

In some configurations, the machine learning model may be a neural network, such as a DCN, for example. In this configuration, the computational stage may comprise a layer of the neural network. In addition, the parameters may comprise bias values and/or weights. Furthermore, the intermediate calculations may comprise activation values.

As such, in some aspects, the bit width may be selected based on the connectivity of the neural network. For example, the connectivity may comprise whether a layer of the network is in a fully connected configuration, a convolutional configuration or a configuration with a specific sparsity. In some aspects, the bit width for a fully connected layer may be less than the bit width for a convolutional layer of the neural network. Additionally, the weights and/or bias values of the fully connected layer and the convolutional layer may be random in a transfer learning arrangement.

Furthermore, the selection of the bit width may be based on whether the bit width is for a bias value, weight, or activation value. For example, in some aspects, the bit width for bias values, weights, and/or activation values may be based on a number of weights per layer, a number of activation values per layer, filter size per layer, filter stride per layer, and number of filters per layer in the neural network.

The neural network may also be fine-tuned after selection of the bit width for bias values, activation values, and/or weights of each layer.

In some aspects, the process may also inject noise into one or more computational stages of the model. The model accuracy may be determined for each computational stage of the injected noise. The process may further select a level of injected noise that provides a desired level of model accuracy.

In some aspects, the process may further dynamically update the bit width based on performance specifications or system resources or user input.

Figure 5:
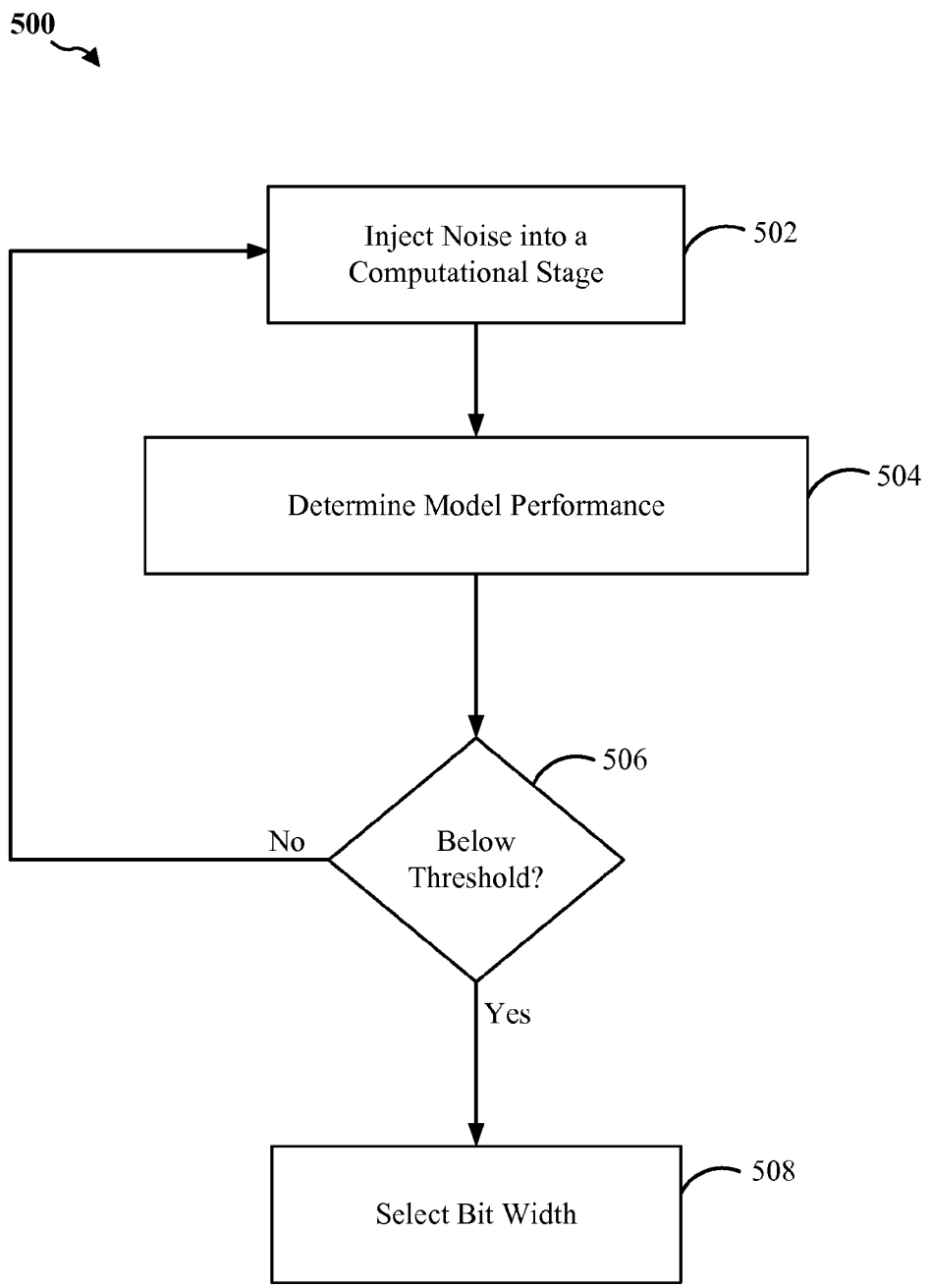

FIG. 5 is a block diagram 500 illustrating a method for selecting bit widths for a fixed point machine learning model in accordance with aspects of the present disclosure. In block 502, the process injects noise into a computational stage of the machine learning model.

In block 504, the process determines a model performance. In some aspects, the model performance may comprise a classification accuracy, classification speed, SQNR, other model performance metric or a combination thereof. The model performance may be evaluated by comparing the performance to a threshold, in block 506. The threshold may comprise a minimally acceptable performance level. If the performance is above the threshold, the process may inject more noise in block 502 and reevaluate the model performance. On the other hand, if the model performance is below the threshold, the bit width may be selected, in block 508, according to the last acceptable noise level.

In some aspects, where the model performance is below the threshold, the noise level may be reduced and the model performance may be reevaluated. Further, the increment for increasing or decreasing the noise level may be adjusted for more fine selection of the bit width.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A computer-implemented method for selecting bit widths for values of a fixed point machine learning model stored in a memory of a neural computing device, comprising:

applying, to an input received at the neural computing device, the model to classify the input;

evaluating, while applying the model to the input, an amount of system resources for the neural computing device and a sensitivity of model accuracy to bit widths at a computational stage of the model;

dynamically selecting a new bit width for values corresponding to one or more of parameters and intermediate calculations in the computational stage of the model based at least in part on at least one of the amount of system resources, the model accuracy, or a combination thereof being less than a threshold; and applying the model to classify the input with the new bit width.

2. The method of claim 1, in which the model accuracy comprises a signal quantization to noise ratio (SQNR) at an output of the model or classification accuracy.

3. The method of claim 1, in which:
the model comprises a neural network and the computational stage is a layer of the neural network;
the parameters comprise one or more of bias values and weights; and
the intermediate calculations comprise activation values.

4. The method of claim 3, in which the new bit width is based at least in part on connectivity of the network.

5. The method of claim 4, in which the connectivity comprises a fully connected configuration, a convolutional configuration, or a configuration with a specific sparsity.

6. The method of claim 5, in which a bit width for a fully connected layer is less than a bit width for a convolutional layer of the neural network.

7. The method of claim 6, in which the weights and/or the bias values of the fully connected layer and the convolutional layer are random in a transfer learning arrangement.

8. The method of claim 3, in which selecting of the new bit width is based at least in part on whether the new bit width is for a bias value, weight, or activation value.

9. The method of claim 3, in which the new bit width for one or more of the bias values, the weights, and the activation values is based at least in part on a number of weights per layer, a number of activation values per layer, filter size per layer, filter stride per layer, and number of filters per layer in the neural network.

10. The method of claim 3, further comprising fine-tuning the network after selecting one or more of the new bit width for the bias values, the activation values, and the weights of each layer.

11. The method of claim 1, in which a bit width for the intermediate calculations of the computational stage is less than a bit width for the parameters in the computational stage.

12. The method of claim 1, further comprising:
injecting noise into the computational stage of the model;
determining a model accuracy for the computational stage of the injected noise; and
selecting a level of injected noise that provides a desired level of model accuracy.

13. The method of claim 1, further comprising dynamically selecting the new bit width based at least in part on performance specifications or user input.

14. The method of claim 1, in which an output layer uses a floating point number format.

15. A neural computing device for selecting bit widths for values of a fixed point machine learning model, comprising:
a memory; and
at least one processor coupled to the memory, the at least one processor configured:
to apply, to an input received at the neural computing device, the model to classify the input;
to evaluate, while applying the model to the input, an amount of system resources for the neural computing device and a sensitivity of model accuracy to bit widths at a computational stage of the model;
to dynamically select a new bit width for values corresponding to one or more of parameters and intermediate calculations in the computational stage of the model based at least in part on at least one of the amount of system resources, the model accuracy, or a combination thereof being less than a threshold, the values stored in the memory; and
to apply the model to classify the input with the new bit width.

16. The neural computing device of claim 15, in which the model accuracy comprises a signal quantization to noise ratio (SQNR) at an output of the model or classification accuracy.

17. The neural computing device of claim 15, in which:
the model comprises a neural network and the computational stage is a layer of the neural network;
the parameters comprise one or more of bias values and weights; and
the intermediate calculations comprise activation values.

18. The neural computing device of claim 17, in which the at least one processor is further configured to select the new bit width based at least in part on connectivity of the network.

19. The neural computing device of claim 18, in which the connectivity comprises a fully connected configuration, a convolutional configuration or a configuration with a specific sparsity.

20. The neural computing device of claim 19, in which a bit width for a fully connected layer is less than a bit width for a convolutional layer of the neural network.

21. The neural computing device of claim 20, in which one or more of the weights or the bias values of the fully connected layer and the convolutional layer are random in a transfer learning arrangement.

22. The neural computing device of claim 17, in which the at least one processor is further configured to select the new bit width based at least in part on whether the new bit width is for a bias value, weight, or activation value.

23. The neural computing device of claim 17, in which the at least one processor is further configured to select the new bit width for one or more of the bias values, the weights, and the activation values based at least in part on a number of weights per layer, a number of activation values per layer, filter size per layer, filter stride per layer, and number of filters per layer in the neural network.

24. The neural computing device of claim 17, in which the at least one processor is further configured to fine-tune the network after selecting one or more of the new bit width for the bias values, the activation values, and the weights of each layer.

25. The neural computing device of claim 15, in which the at least one processor is further configured to select a bit width for the intermediate calculations of the computational stage to be less than a bit width for the parameters in the computational stage.

26. The neural computing device of claim 15, in which the at least one processor is further configured:
to inject noise into the computational stage of the model;
to determine a model accuracy for the computational stage of the injected noise; and
to select a level of injected noise that provides a desired level of model accuracy.

27. The neural computing device of claim 15, in which the at least one processor is further configured to dynamically select the new bit width based at least in part on performance specifications or user input.

28. The neural computing device of claim 15, in which an output layer of the model uses a floating point number format.

29. An apparatus for selecting bit widths for values of a fixed point machine learning model stored in a memory of a neural computing device, comprising:
means for applying, to an input received at the neural computing device, the model to classify the input;

means for evaluating, while applying the model, an amount of system resources for the neural computing device and a sensitivity of model accuracy to bit widths at a computational stage of the model;

means for dynamically selecting a new bit width for values corresponding to one or more of parameters and intermediate calculations in the computational stage of the model based at least in part on at least one of the amount of system resources, the model accuracy, or a combination thereof being less than a threshold; and means for applying the model to classify the input with the new bit width.

30. A non-transitory computer readable medium having encoded thereon program code for selecting bit widths for values of a fixed point machine learning model stored in a memory of a neural computing device, the program code being executed by a processor and comprising:

program code to apply, to an input received at the neural computing device, the model to classify the input;

program code to evaluate, while applying the model to the input, an amount of system resources for the neural computing device and a sensitivity of model accuracy to bit widths at a computational stage of the model;

program code to dynamically select a new bit width for values corresponding to one or more of parameters and intermediate calculations in the computational stage of the model based at least in part on at least one of the amount of system resources, the model accuracy, or a combination thereof being less than a threshold; and program code to apply the model to classify the input with the new bit width.

* * * * *